(12) United States Patent
Tanaka et al.

(10) Patent No.: US 10,557,633 B2
(45) Date of Patent: Feb. 11, 2020

(54) COMBUSTOR INCLUDING PREMIXING BURNERS AND STAGNATION ELIMINATING BLOCKS PROVIDED THEREBETWEEN, AND GAS TURBINE

(71) Applicant: MITSUBISHI HITACHI POWER SYSTEMS, LTD., Kanagawa (JP)

(72) Inventors: Yusuke Tanaka, Tokyo (JP); Keijiro Saito, Tokyo (JP); Shinji Akamatsu, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 334 days.

(21) Appl. No.: 15/512,753

(22) PCT Filed: Oct. 15, 2015

(86) PCT No.: PCT/JP2015/079197
§ 371 (c)(1),
(2) Date: Mar. 20, 2017

(87) PCT Pub. No.: WO2016/063791
PCT Pub. Date: Apr. 28, 2016

(65) Prior Publication Data
US 2017/0292705 A1    Oct. 12, 2017

(30) Foreign Application Priority Data
Oct. 24, 2014   (JP) ................................ 2014-217028

(51) Int. Cl.
*F23R 3/12*    (2006.01)
*F23R 3/16*    (2006.01)
(Continued)

(52) U.S. Cl.
CPC .................. *F23R 3/12* (2013.01); *F02C 3/04* (2013.01); *F23R 3/16* (2013.01); *F23R 3/286* (2013.01);
(Continued)

(58) Field of Classification Search
CPC .. F23R 3/283; F23R 3/002; F23R 3/12; F23R 3/16; F23R 3/286; F23R 3/343; F23R 3/60; F02C 3/04; F05D 2240/35
See application file for complete search history.

(56) References Cited

U.S. PATENT DOCUMENTS 5,076,062 A * 12/1991 Abreu ....................... F02C 7/18
60/749
6,038,861 A    3/2000 Amos et al.

FOREIGN PATENT DOCUMENTS

JP    2013-190196    9/2013
JP    2014-55689    3/2014

OTHER PUBLICATIONS

International Search Report dated Jan. 19, 2016 in corresponding International (PCT) Application No. PCT/JP2015/079197.
(Continued)

*Primary Examiner* — Jason H Duger
(74) *Attorney, Agent, or Firm* — Wenderoth, Lind & Ponack, L.L.P.

(57) ABSTRACT

A combustor according to the present invention is provided with: a pilot burner (15) disposed along an axis (P); a plurality of premixing burners (16), each of which has a premixing swirler cylinder (19) and a premixing nozzle (20) disposed inside the premixing swirler cylinder (19) and that are disposed about the axis (P) in the circumferential direction so as to surround the periphery of the pilot burner (15); a substrate (23) through which the pilot burner (15) and the premixing swirler cylinders (19) are individually inserted so as to be supported therein; and stagnation eliminating blocks
(Continued)

(27) that are provided so as to fill spaces between the premixing swirler cylinders (19) on a surface of the substrate (23) on the downstream side, wherein air film supplying ports (38) that form air films A on surfaces of the stagnation eliminating blocks (27) are formed in the stagnation eliminating blocks (27).

5 Claims, 8 Drawing Sheets

(51) Int. Cl.
      *F23R 3/28*       (2006.01)
      *F02C 3/04*       (2006.01)

(52) U.S. Cl.
      CPC ...... *F05D 2220/32* (2013.01); *F05D 2240/35* (2013.01)

(56) References Cited

OTHER PUBLICATIONS

Written Opinion dated Jan. 19, 2016 in corresponding International (PCT) Application No. PCT/JP2015/079197.

\* cited by examiner

COMBUSTOR INCLUDING PREMIXING BURNERS AND STAGNATION ELIMINATING BLOCKS PROVIDED THEREBETWEEN, AND GAS TURBINE

TECHNICAL FIELD

The present invention relates to a combustor, and to a gas turbine provided therewith.

The present application claims priority right based on Japanese Patent Application No. 2014-217028 submitted on Oct. 24, 2014, and quotes descriptions thereof.

BACKGROUND ART

In a combustor of a gas turbine or the like, a premix type combustion method has been widely used. The premix type combustion method premixes fuel with compressed air (combustion air) fed from a compressor to generate mixed gas and causes the fuel-air mixture to be combusted (for example, see Patent Documents 1 to 3).

As this kind of combustor, there is known a combustor that has a pilot burner provided on the axis line of the combustor and a plurality of premixing burners disposed in parallel to the pilot burner. Further, the pilot burner and the premixing burner are fixed to the main body of the combustor by being supported by a substrate, on which support holes are formed corresponding to the radii of the pilot burner and the premixing burner. Further, the substrate is provided with a swirler cylinder, which has an elliptic cylindrical shape and is disposed so as to cover a premixing nozzle from the outside in the radial direction.

A premixing burner with such a configuration generates premixed gas by mixing fuel and air in the interior thereof, and forms a flame extending downstream from the tip of the swirler cylinder by combusting the premixed gas.

Here, in a gas turbine combustor employing the premix type combustion method, there is a possibility of stagnation occurring in the flow of the combustion gas in the region between a neighboring plurality of swirler cylinders. When a stagnation of combustion gas occurs in such a region, an offset occurs in the concentration distribution of the combustion gas within the combustion cylinder. This leads to a decrease in combustion efficiency and an increase in nitrogen oxide (NOx) in the exhaust gas.

For example, patent document 1 describes a known technique for avoiding occurrences of such stagnation. In patent document 1, a combustor is described which is provided with stagnation eliminating structures which fill the space between swirler cylinders. These stagnation eliminating structures are substantially triangular pillar-shaped members formed so the width becomes smaller from the substrate toward the downstream side. These stagnation eliminating structures make it difficult for stagnation to occur from the combustion gas flowing out from the swirler cylinders by filling the spaces between swirler cylinders.

These stagnation eliminating structures are close to the flame because they correspond to the premixed gas channel outlets; in particular, the downstream end part of the stagnation eliminating structures is the part closest to the flame. Because of this, when stagnation of gas between swirler cylinders or the like occurs, there is a risk of a flashback phenomenon occurring. If a flashback phenomenon occurs, there is a risk of burning a premixing nozzle or a swirler cylinder.

Regarding burns occurring at the end part on the downstream side in this manner, the same patent document 1 proposes providing a plurality of hollow holes on the stagnation eliminating structures. This plurality of hollow holes is provided from the upstream side to the downstream side of the stagnation eliminating structures. The upstream side of the hollow holes is open, and the downstream side is closed. When a burn occurs from exposure to the flame, the closure on the downstream side opens up, air from the upstream side opening is supplied to the burned part, which mitigates further burns.

CITATION LIST

Patent Document

Patent Document 1: Japanese Unexamined Patent Application Publication No. 2013-190196A

SUMMARY OF INVENTION

Technical Problem

However, the technique described in patent document 1 is mitigation of burn damage, and does not proactively aim to avoid flashback phenomenon, which is the cause of burning. Once burning occurs on a stagnation eliminating structure, because combustion gas stagnation occurs immediately, there is a possibility that it will lead to a dramatic reduction in combustion efficiency, and that it will lead to an increase in NOx generation from turbulence occurring in the combustion area.

An object of the present invention is to provide a combustor and a gas turbine that can mitigate the reduction of combustion efficiency and generation of NOx.

Solution to Problem

In order to resolve the problem described above, the combustor and gas turbine of the present invention propose the following means.

According to the first mode of the present invention, a combustor is composed of a pilot burner disposed along an axis; a plurality of premixing burners, each of which has a premixing swirler cylinder and a premixing nozzle disposed inside the premixing swirler cylinder and that are disposed about the axis in the circumferential direction so as to surround the periphery of the pilot burner; a substrate, through which the pilot burner and the premixing swirler cylinders are individually inserted so as to be supported therein; and stagnation eliminating blocks that are provided so as to fill spaces between the premixing swirler cylinders at a surface of the substrate on the downstream side; wherein air film supplying ports that form air films on surfaces of the stagnation eliminating blocks are formed in the stagnation eliminating blocks.

According to the configuration described above, an air film can be supplied from the air film supplying port onto a surface of the stagnation eliminating block. By this, the occurrence of gas stagnation in a space between swirler cylinders can be mitigated, and the surface of the stagnation eliminating blocks can be protected from heat by the air film.

Further, according to the second mode of the present invention, the air film supplying port from the combustor according to the first mode can be configured to eject substrate air from the air film supplying port by communicating with an air inlet provided on the substrate.

According to the configuration described above, substrate air which flows on the upstream side of the substrate can be directed to the air inlet and ejected from the air film supplying port. That is, the substrate air can act as an air film.

Further, according to the third mode of the present invention, the air film supplying ports from combustor according to the first mode may communicate with an air inlet provided on a surface on the outside in the radial direction of the stagnation eliminating blocks.

According to the configuration described above, the substrate air can be provided for combustion, whereas air supplied from the exterior can be introduced from the air inlet as an air film.

Further, according to the fourth mode of the present invention, a plurality of the air film supplying ports are provided to the combustor according to the second or third mode, and each of the air film supplying ports may be provided in a space containing the end part in the outside in the radial direction of the downstream end part of the stagnation eliminating block, and in a space containing the end part in the inside in the radial direction.

It is known that the possibility of stagnation occurring is particularly high in the space containing the end part of the outside in the radial direction on the downstream end part of the stagnation eliminating blocks, and in the space containing the end part of the inside in the radial direction. However, according to a configuration as described above, such a possibility can be reduced by providing air film supplying ports at each space.

Further, according to a fifth mode of the present invention, the stagnation eliminating blocks from the combustor according to the fourth mode may be formed so the circumferential direction dimension decreases from the upstream side to the downstream side, and the plurality of air film supplying ports may be provided on the surface on one side of the circumferential direction of the stagnation eliminating blocks, and on the surface on another side of the circumferential direction of the stagnation eliminating blocks.

According to a configuration as described above, combustion gas can be directed smoothly downstream because the dimension of the circumferential direction of the stagnation eliminating blocks is formed to decrease from the upstream side to the downstream side. Additionally, an air film can be supplied along the flow of the combustion gas from the air film supplying ports.

Further, according to a sixth mode of the present invention, a gas turbine is provided with a combustor according to any one of the modes described above; a compressor for supplying compressed air to the combustor; and a turbine for supplying combustion gas generated by the combustor.

According to a configuration as described above, a gas turbine can be provided which improves combustion efficiency and mitigates NOx generation.

Advantageous Effects of Invention

According to the combustor and the gas turbine described above, the combustion efficiency can be improved, and the generation of NOx can be further mitigated.

DESCRIPTION OF EMBODIMENTS

First Embodiment

A first embodiment of the present invention will be described below with reference to the drawings.

Figure 1:
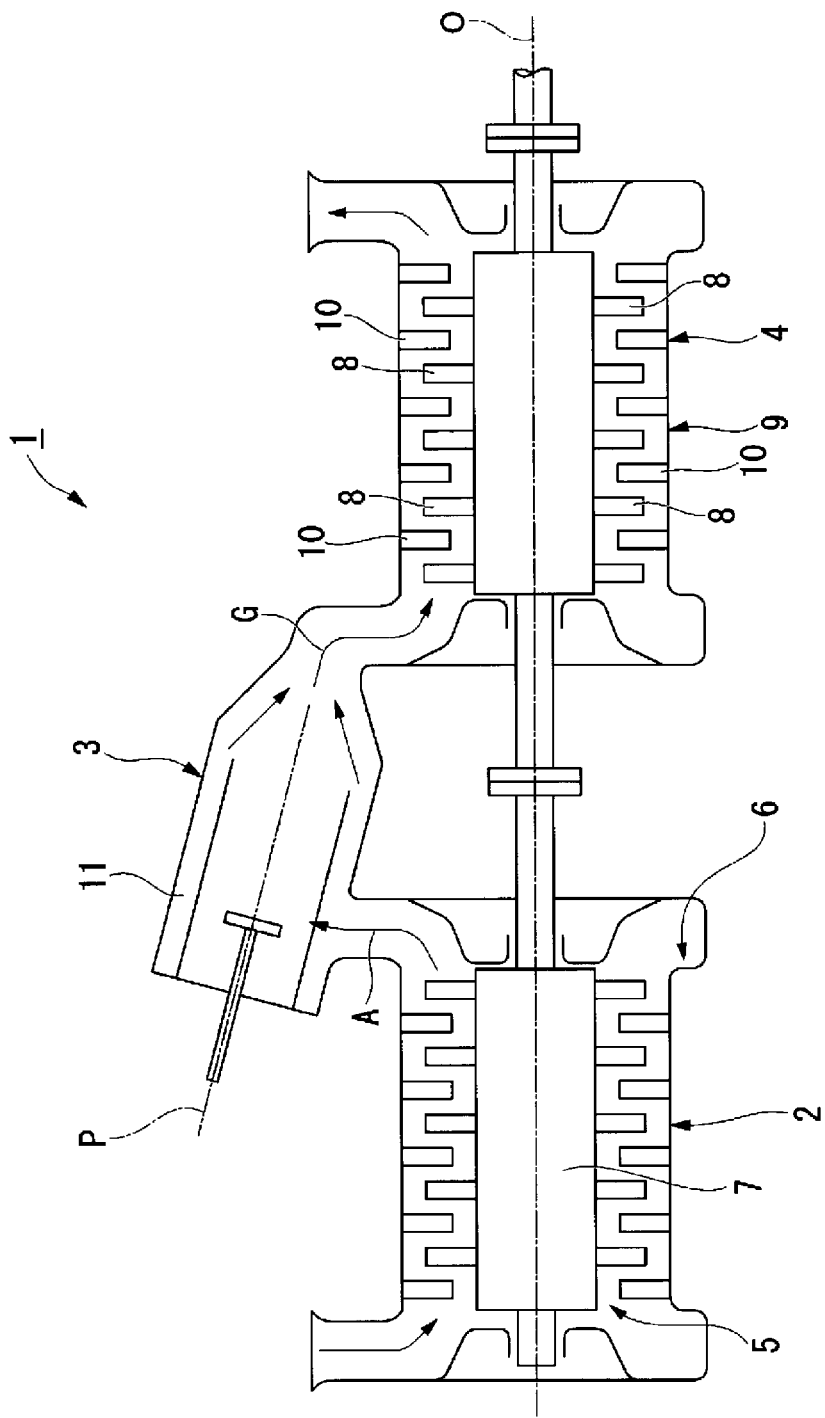
FIG. 1 is a schematic view of a gas turbine according to a first embodiment the present invention.

As illustrated in FIG. 1, a gas turbine 1 according to the present embodiment is provided with a compressor 2, which takes in a large volume of air into its interior and compresses it; a combustor 3 for mixing fuel into compressed air A compressed by the compressor 2 and combusting it; and a turbine 4 for converting the heat energy from the combustion gas G introduced from the combustor 3 into rotational energy.

The compressor 2 and the turbine 4 are provided with a rotor 5, which is connected so they rotate as one body; and a stator 6 for surrounding the outer peripheral side of the rotor 5. The rotor 5 has a rotating shaft 7 and a plurality of circular blade groups 8 that is fixed with an open interval between them in the direction of the axis O. Each circular blade group 8 is configured to have a plurality of blades fixed with intervals open between them in the circumferential direction on the outer periphery of the rotating shaft 7.

The stators 6 are each provided with a casing 9 and a plurality of circular vane groups 10 fixed with an interval open between them in the direction of the axis O within a chamber 11 sectioned off by the casing 9. Each circular vane group 10 has a plurality of vanes fixed with an interval open between them in the circumferential direction of the axis O, on the inner surface of the casing 9. The circular vane groups 10 are each disposed so as to alternate with a plurality of circular blade groups 8 in the direction of the axis O.

Further, the combustor 3 is provided in the interior of the casing 9 (the chamber 11). The combustor 3 has a pilot burner 15 disposed along an axis P; a plurality of premixing burners 16 that are disposed along the circumferential direction of the pilot burner 15; a substrate 23 through which the pilot burner 15 and the premixing burner 16 are inserted; and stagnation eliminating blocks 27 provided as one body on the substrate 23.

The combustor 3 is provided with a combustion cylinder 12, which has a substantially cylindrical shape having in its interior a combustion area for combusting fuel and combustion air, and a swirler support cylinder 13, which has a substantially cylindrical shape and is accommodated in the inner peripheral side of the combustion cylinder 12. The combustion cylinder 12 is provided with a large diameter part 12A having a diameter dimension larger than that of the swirler support cylinder 13, and a small diameter part 12C having a diameter dimension smaller than the large diameter part 12A. A substantially circular ridge part 12B is provided between the large diameter part 12A and the small diameter part 12B, formed so that the dimension in the radial direction decreases sharply. This ridge part 12B and the end part of the swirler support cylinder 13 oppose each other in the direction of the axis P. That is, the inner diameter dimension of the combustion cylinder 12 at the small diameter part 12C is set to be smaller than the diameter dimension of the swirler support cylinder 13.

The combustion cylinder 12 and the swirler support cylinder 13 are disposed together along the same axis P. The swirler support cylinder 13 is fixed by a fixing member 14 to the combustion cylinder 12. The fixing member 14 is provided, for example, on the outer peripheral side of the swirler support cylinder 13 with an interval open in the circumferential direction. Further, a constant gap is formed between the inner peripheral surface of the combustion cylinder 12 and the outer peripheral surface of the swirler support cylinder 13; this acts as an air channel through which the compressed air A flows.

The pilot burner 15 and the premixing burner 16 are provided on the inner peripheral side of the swirler support cylinder 13. The pilot burner 15 is disposed so as to extend along the axis P. A plurality of the premixing burner 16 is disposed along the circumferential direction, so as to surround the periphery of the pilot burner 15. In the combustor 3 according to the present embodiment, eight premixing burners 16 are arranged along the circumferential direction of the combustor 3 with intervals open between them, surrounding the pilot burner 15. In the following description, the side on which the pilot burner 15 and the premixing burners 16 is positioned is called the upstream side, and the side positioned on the opposite side of the upstream side along the axis P direction is called the downstream side.

The pilot burner 15 has a pilot nozzle 17, which is not illustrated, in its interior. Further, a pilot cone 18 is provided on the outer periphery of the pilot nozzle 17. A tapered cone portion 18C, which is formed so the radial direction dimension progressively expands from the upstream side to the downstream side, is provided on the downstream side end part of the pilot cone 18. The downstream side end part of the tapered cone portion 18C is open toward the interior of the combustion cylinder 12. In the pilot burner 15 configured in this manner, fuel is supplied to the pilot nozzle 17 from the exterior. This fuel is ejected from the pilot nozzle 17.

Further, each premixing burner 16 has a premixing swirler cylinder 19, which has a substantially cylindrical shape; and a premixing nozzle 20 disposed in the premixing swirler cylinder 19.

The premixing swirler cylinder 19 and the premixing nozzle 20 are concentrically disposed. The premixing swirler 19 is formed so that the shape of the cross section changes gradually from the upstream side to the downstream side. As illustrated by the dashed line in FIG. 3, the cross sectional shape viewed from the direction of the axis P forms a substantially circular shape at the upstream side. On the other hand, on the downstream side end part, the cross section shape of the premixing swirler cylinder 19 forms a substantially rectangular shape, which curves along the inner periphery of the combustion cylinder 12. In more detail, and as illustrated by the solid line in the same figure, the cross sectional shape at the downstream side end part of the premixing swirler cylinder 19 forms a substantially rectangular shape sectioned off by a pair of short side parts 19A extending in a substantially straight line along a direction crossing the axis P, and a pair of long side parts 19B which connect both end parts of the short side parts 19A and curve in an arc shape along the circumferential direction of the combustor 3. Further, a constant gap is formed between neighboring premixing swirler cylinders 19.

The pilot burner 15 is provided with a pilot swirler 20P, which is provided surrounding the periphery of the pilot nozzle 17. The pilot swirler 20P has a plurality of swirler vanes (not illustrated). The plurality of swirler vanes are each disposed forming a constant angle θ with the axis P. By this, a rotational component is imparted to the compressed air A passing through the pilot swirler 20P, leading to rotational flow.

In the same manner, the premixing burner 16 has a premixing swirler 20M provided on the upstream side of the premixing nozzle 20. The premixing swirler 20M is provided with a plurality of swirler vanes, and imparts a rotational component to the compressed air A passing through the inside of the premixing swirler cylinder 19.

Further, each swirler vane of the premixing swirler 20M is provided with a plurality of fuel ejection holes 22. A combustion gas G, composed of fuel supplied from the exterior and air mixed together, is ejected from these fuel ejection holes toward the downstream side.

Figure 3:
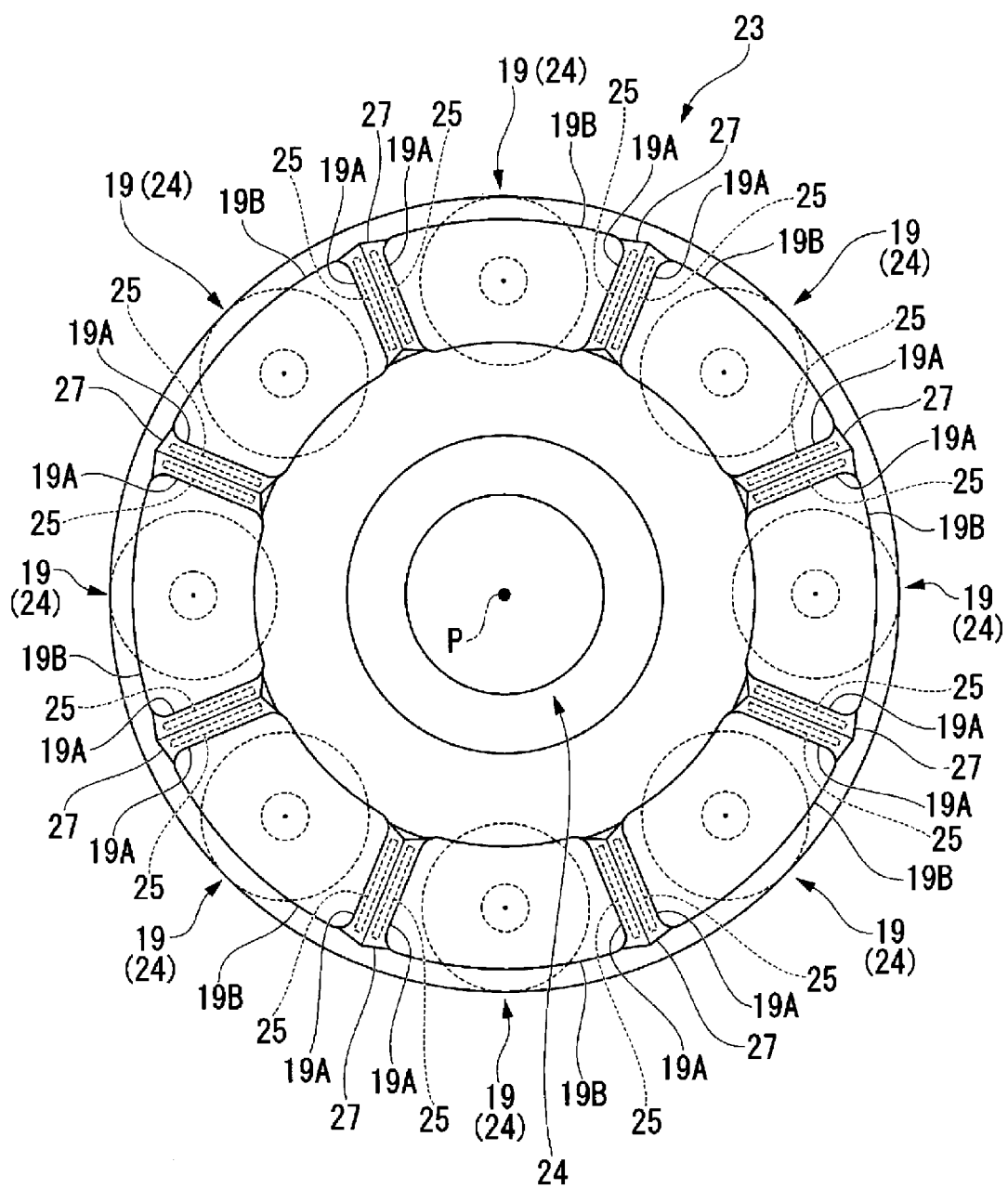
FIG. 3 is a schematic view of a substrate according to the first embodiment of the present invention viewed from a downstream side.

The pilot burner 15 and the premixing burners 16 are both supported by the substrate 23. As illustrated in FIG. 3, the substrate 23 is provided with a plurality of support openings 24 corresponding to the outer diameter dimension of the pilot burner 15 and the premixing burners 16. The pilot burner 15 and the premixing burners 16 are fixed by being individually inserted into the plurality of support openings 24. The end edge of the inside in the radial direction of the substrate 23 is provided so it slants toward the upstream side from the downstream side, thereby avoiding interference with the pilot cone 18.

Further, as illustrated in FIG. 3, two substrate slit parts 25 are provided side by side along the circumferential direction in a space between support openings 24 of the premixing burners 16, on the substrate 23. The substrate slit parts 25 each form a substantially rectangular shape extending in the radial direction corresponding to the air inlets 26, which are described later, and are through-holes which pierce the substrate 23 in the axial direction. The two substrate slit parts 25 are arranged so the long side of each is next to each other along the circumferential direction, with an interval between them.

A plurality of stagnation eliminating blocks 27 are provided as one body on a surface on the downstream side of the substrate 23. These stagnation eliminating blocks 27 are disposed so as to fill a space between the plurality of premixing swirler cylinders 19 arranged along the circumferential direction with an interval open between them. Specifically, the stagnation eliminating blocks 27 are disposed in the space between each short side part 19A of neighboring premixing swirler cylinders 19.

Figure 2:
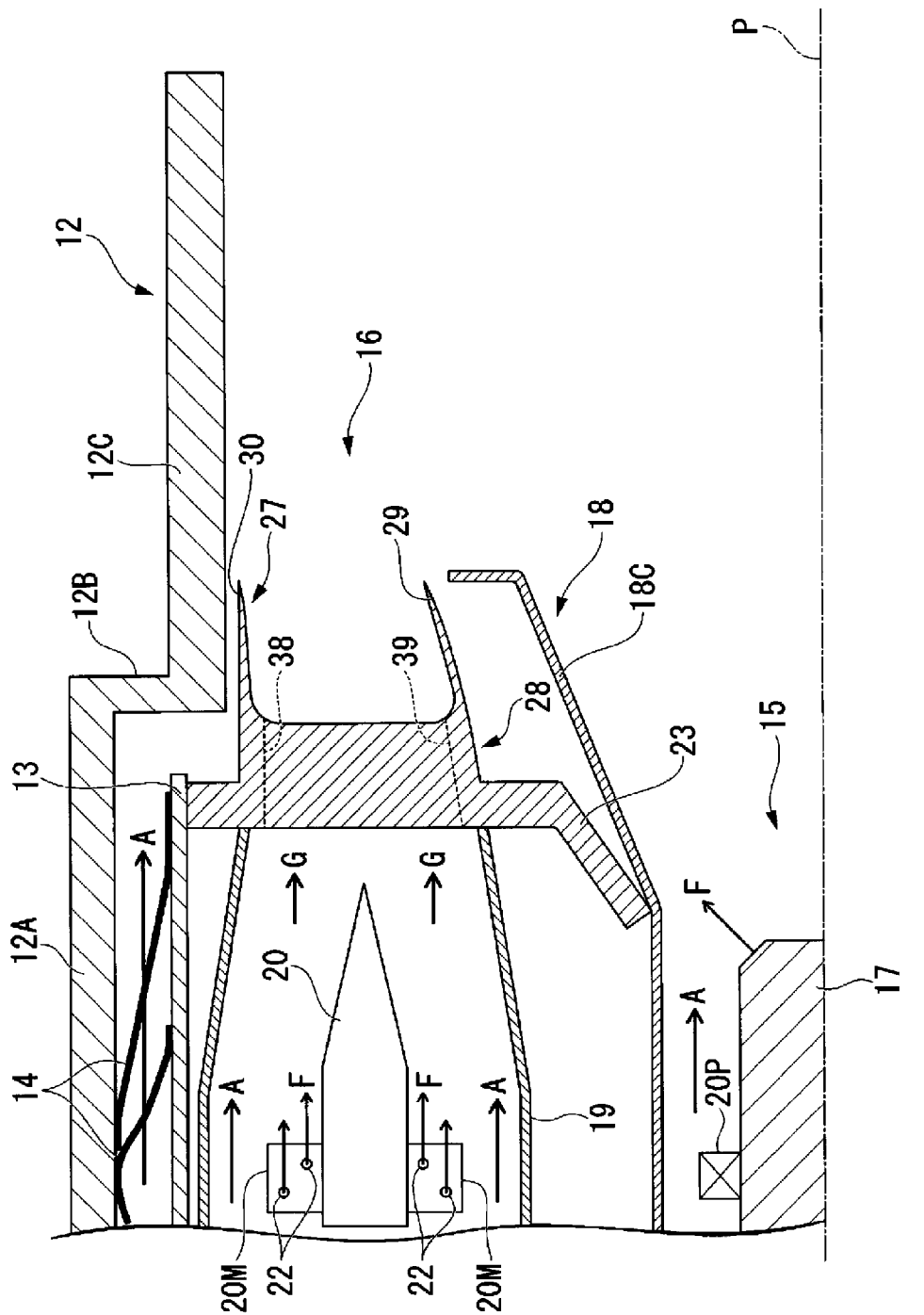
FIG. 2 is an expanded view of important parts of a combustor according to the first embodiment of the present invention.

The detailed configuration of the stagnation eliminating blocks 27 according to the present invention will be described with reference to FIG. 2 to FIG. 5. As illustrated in FIG. 2, the stagnation eliminating blocks 27 viewed from the circumferential direction have a block base part 28 provided continuously from the substrate 23; an inside protruding part 29, which has a pointed shape and protrudes toward the downstream side from the block base part 28; and an outside protruding part 30.

The surface on the side of the substrate 23 on the block base part 28 (the upstream side) forms a block substrate surface 31 by being formed in a substantially rectangular shape extending along the radial direction of the combustor 3. The side part on both sides of the circumferential direction of the block substrate surface 31 is formed curved so as to correspond to the shape of the short side parts 19A of the premixing swirler cylinder 19. In other words, both sides on the circumferential direction of the block substrate surface 31 are formed so they are recessed toward the inside along the circumferential direction. Meanwhile, both sides in the radial direction of the block substrate surface 31 are formed curving in an arc shape along the circumferential direction. That is, both sides in the radial direction are formed curving so they protrude toward the outside in the radial direction from the inside in the radial direction.

Figure 5:
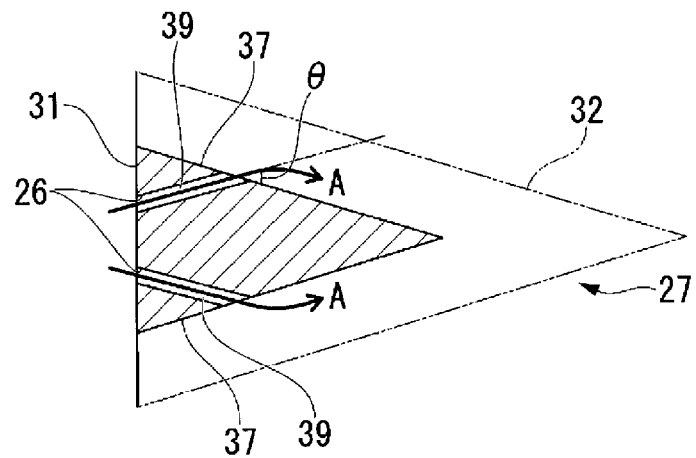
FIG. 5 is a drawing of a stagnation eliminating block according to the first embodiment of the present invention viewed from a radial direction of the combustor.

The stagnation eliminating blocks 27 extend toward the downstream side from the block substrate surface 31 formed as described above. Specifically, as illustrated in FIG. 5, the stagnation eliminating blocks 27, when viewed from the radial direction, form an isosceles triangle shape, where the block substrate surface 31 is the base side and the direction toward the downstream side is the height. In other words, the stagnation eliminating blocks 27 are formed so the dimension in the circumferential direction decreases from the upstream side to the downstream side.

A block outer peripheral surface 32, which forms the surface of the outside in the radial direction of the stagnation eliminating blocks 27, extends toward the downstream side along a direction substantially orthogonal to the block substrate surface 31. Further, the block outer periphery surface 32 protrudes in an arc shape toward the outside in the radial direction, along the inner periphery shape of the combustor 3.

The block inner periphery surface 33, which forms the surface on the inside in the radial direction of the stagnation eliminating blocks 27, extend slightly slanted toward the outside in the radial direction, where the block substrate surface 31 is the reference. More specifically, the block inner periphery surface 33 is slanted and extends so it gradually curves from the inside to the outside in the radial direction. Further, the block inner periphery surface 33 is recessed in an arc shape toward the outside in the radial direction, along the inner periphery shape of the combustor 3.

Additionally, the center part of the stagnation eliminating blocks 27 when viewed from the radial direction is analogous to each of the block outer periphery surface 32 and the block inner periphery surface 33, and form an isosceles triangle shape which has a smaller area than the block outer periphery surface 32 and the block inner periphery surface 33.

Further, the cross sectional area of the stagnation eliminating blocks 27 when viewed from the radial direction is formed so that it continuously decreases from the block outer periphery surface 32 toward the central part.

Meanwhile, the cross sectional area of the stagnation eliminating blocks 27 when viewed from the radial direction is formed so that it continuously increases from the central part toward the block inner periphery surface 33. In other words, the stagnation eliminating blocks 27 compose a substantially triangular pillar shape, where a neck is formed in the central part in the radial direction (the height direction). Further, a part of the inside in the radial direction on the downstream side of the stagnation eliminating blocks 27 protrudes toward the downstream side, forming the inside protruding part 29. In a similar manner, a part of the outside in the radial direction on the downstream side protrudes toward the downstream side, forming the outside protruding part 30. The outside protruding part 30 is set so the dimension in the axial direction is large compared to the inside protruding part 29.

As such, the end edge of the downstream side of the stagnation eliminating block 27 is composed of an outside curved part 34 extending from the tip of the outside protruding part 30 toward the upstream side while curving toward the inside in the radial direction; an inside curved part 35 extending from the tip of the inside protruding part 29 toward the upstream side while curving toward the outside in the radial direction; and a straight part 36, which connects the outside curved part 34 and the inside curved part 35 in a straight line.

Figure 4:
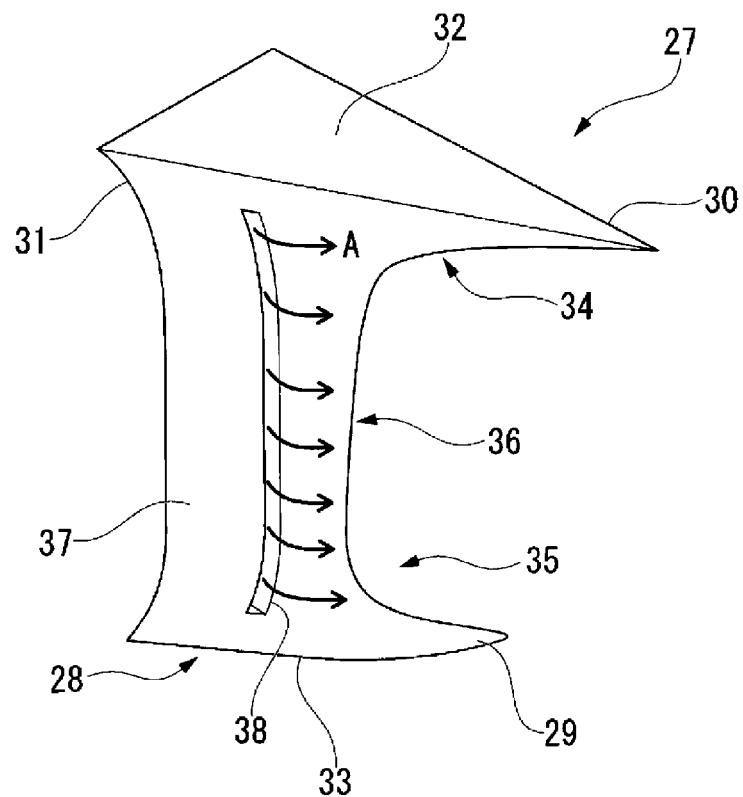
FIG. 4 is a diagonal view of a stagnation eliminating block according to the first embodiment of the present invention.

Further, a pair of surfaces forming the one side and the other side in the circumferential direction of the stagnation eliminating blocks 27 are each the block side surfaces 37. On this pair of block side surfaces 37 is formed an air film supplying port 38 for flowing an air film. In the stagnation eliminating blocks 27 according to the present embodiment, as illustrated in FIG. 4, one air film supplying port 38 is provided on each block side surface 37. Specifically, each air film supplying port 38 is formed in a substantially rectangular slit shape extending along the radial direction.

The block substrate surface 31 is provided with the air inlet 26, which is connected to the air film supplying port 38. As illustrated in FIG. 5, two air inlets 26 are provided with an interval between them in the circumferential direction on the block substrate surface 31.

The air inlets 26 and the air film supplying ports 38 are connected in a straight line when viewed from the radial direction. Further, the air inlets 26 and the substrate slit parts 25 are connected to each other. By this, the substrate slit part 25 and the air film supplying ports 38 compose an air film channel 39 by being connected via the air inlet 26.

Note that the angle θ formed by the direction in which the air film channel 39 extends and the block side surfaces 37 can be determined appropriately according to the design. That is, by adjusting the angle θ formed by the air film channel 39 and the block side surfaces 37, the tracking properties of the air film relating to the block side surfaces 37 can be freely controlled. For example, when the angle θ is adjusted so as to form an acute angle, the air film can be made to flow in the vicinity of the block side surfaces 37. The optimal direction for the air film channel 39 to extend is determined by considering the flow of such an air film and various conditions such as structural strength of the stagnation eliminating blocks 27.

The gas turbine 1 provided with the combustor 3 configured in the aforementioned manner operates in the following manner.

First, fuel supplied by the pilot nozzle 17 of the combustor 3 is ignited by an igniter, which is not illustrated; this causes a pilot flame to be formed in the interior of the pilot burner 15. Next, the pilot flame ignites a premixed gas F supplied from the premixing nozzle 20, forming a premixing flame. This premixed flame is stabilized in the interior of the combustion cylinder 12, generating the high temperature combustion gas G. The combustion gas G generated in the combustion cylinder 12 flows toward and rotationally drives the following turbine 4.

Here, as illustrated in FIG. 1, the compressed air A is supplied to the combustor 3 from the compressor 2. This compressed air A flows through the interior of the combustor 3 toward the downstream side from the upstream side. In more detail, as illustrated in FIG. 2, the compressed air A flows through the region sectioned off by the air channel between the combustion cylinder 12 and the swirler support cylinder 13, the interior of the pilot burner 15, the interior of the premixing burner 16, the outer peripheral surface of the premixing swirler cylinder 19, and the outer peripheral surface of the pilot cone 18.

By this, in the interior of the pilot burner 15, the pilot flame formed downstream of the pilot nozzle 17 is stabilized by the compressed air A being supplied thereto.

In the interior of the premixing burner 16, the compressed air A is mixed with the fuel ejected from the fuel ejection hole 22 provided on the premixing swirler 20M. This generates a premixed gas F of fuel and air. After being ejected toward the downstream side from the swirler support cylinder 13, the premixed gas F is ignited by the pilot flame described above, forming a premixing flame.

At this time, as described above, the compressed air A is flowing through the space sectioned off by the outer peripheral surface of the premixing swirler cylinder 19 and the outer peripheral surface of the pilot cone 18. After flowing toward the substrate 23 provided on the downstream side, the compressed air A flows toward the downstream side of the substrate 23 via the substrate slit parts 25 provided on the substrate 23. Of the compressed air A, the component which passes through the substrate slit parts 25 in this manner is called substrate air A.

The substrate air A which has flowed toward the downstream side from the substrate slit part 25 is ejected from the air film supplying port 38 via the air film channel 39 provided on the stagnation eliminating block 27. More specifically, as illustrated in FIG. 4 and FIG. 5, it is ejected from a pair of air film supplying ports 38 and flows toward the downstream side along the block side surface 37 of the stagnation eliminating block 27. This forms an air film layer on the surface (the block side surface 37) of the stagnation eliminating block 27.

In this manner, the stagnation eliminating block 27 can be protected from radiant heat and the like from the flame of the combustor 3 by having an air film layer formed on the surface of the stagnation eliminating block 27. That is, the possibility of a burn occurring on the stagnation eliminating block 27 can be reduced.

On one hand, once burning occurs on a stagnation eliminating structure, because stagnation of the combustion gas G occurs immediately, there is a possibility of leading to dramatically reduced combustion efficiency, and leading to an increase in NOx generation from turbulence occurring in the combustion area. However, according to a configuration as described above, such a possibility can be reduced, improving the combustion efficiency of the combustor 3 and achieving a reduction in the concentration of NOx contained in the exhaust gas.

Further, with a configuration such as that described above, the substrate air A flowing through the upstream side of the substrate 23 can be directed to the air inlet 26 and ejected from the air film supplying port 38. That is, the substrate air A can be effectively used as an air film. In other words, instead of separately providing an air film supply source, an air film can be generated.

Second Embodiment

Figure 6:
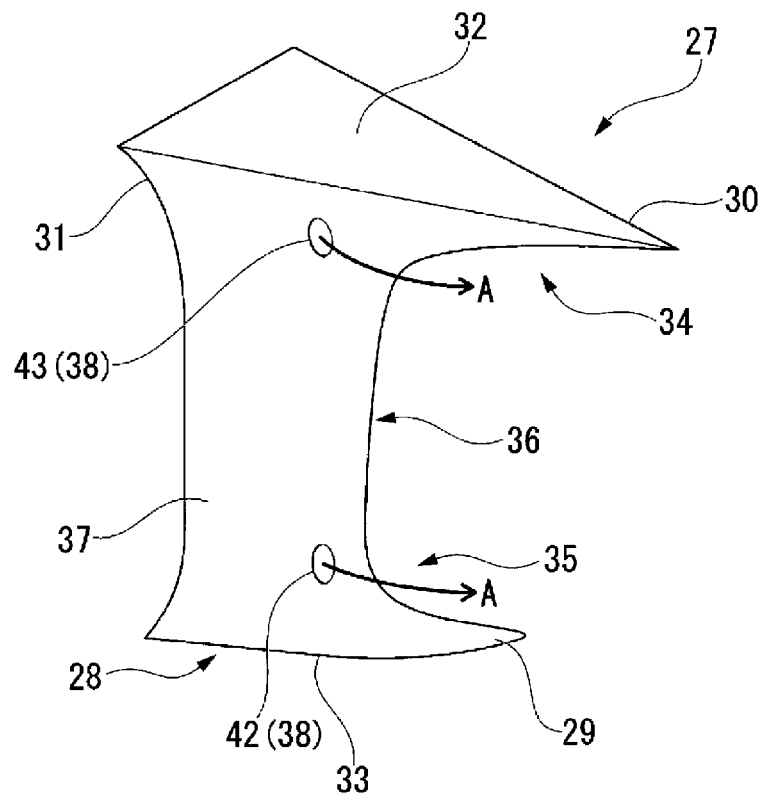
FIG. 6 is a diagonal view of a stagnation eliminating block according to a second embodiment of the present invention.
Figure 7:
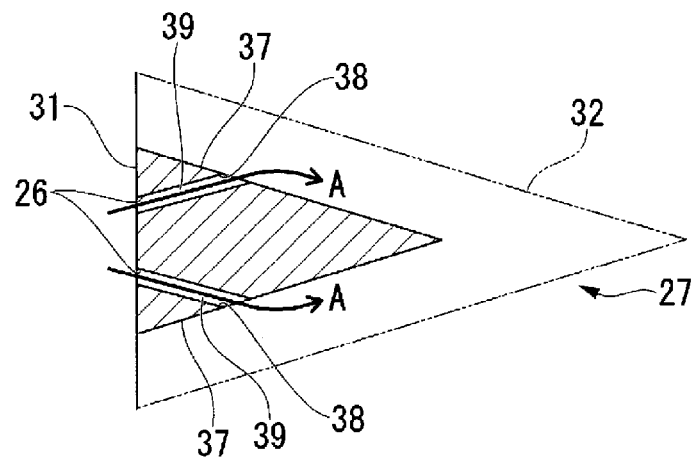
FIG. 7 is a drawing of a stagnation eliminating block according to the second embodiment of the present invention viewed from the radial direction of the combustor.

Next, a second embodiment of the present invention will be described below with reference to FIG. 6 and FIG. 7.

The combustor 3 according to the present embodiment differs from the first embodiment with regard to the following points. That is, in the combustor 3 according to the present embodiment, two air film supplying ports 38 formed on the stagnation eliminating blocks 27 are formed as openings provided on a pair of block side surfaces 37 in the circumferential direction. In the present embodiment, both air film supplying ports 38 have a substantially circular opening shape.

These two air film supplying ports 38 are a first supplying port 42 provided in a space on the inside in the radial direction on the block side surface 37, and a second supply port 43 provided in a space on the outside in the radial direction. In more detail, as illustrated in FIG. 6, the first supplying port 42 is provided in a position corresponding in the direction of the axis P to the inside curved part 35 on the inside protruding part 29 provided on the downstream side of the stagnation eliminating block 27. The second supplying port 43 is provided in a position corresponding in the direction of the axis P to the outside curved part 34 on the outside protruding part 30.

With a stagnation eliminating block 27 configured in the above manner, an air film is ejected from each air film supply port 38, composed of the first supplying port 42 and the second supplying port 43. This air film flows toward the downstream side along the block side surface 37 of the stagnation eliminating block 27, in the same manner as in the first embodiment described above. This forms an air film layer in each space inside and outside in the radial direction on the block side surface 37.

It is known that the possibility of stagnation occurring is particularly high in the space containing the end part on the outside in the radial direction on the downstream end part of the stagnation eliminating blocks 27, and in the space containing the end part on the inside in the radial direction. By this, the possibility of a burn occurring on the stagnation eliminating block 27 increases. However, according to a configuration as described above, an air film can be supplied in a focused manner because an air film supplying port 38 is provided for each space.

Specifically, the air film supplied from the first supplying port 42 forms an air film layer by flowing over the surface of the inside curved part 35 of the stagnation eliminating block 27. The air film supplied from the second supplying port 43 forms an air film layer by flowing over the surface of the outside curved part 34 of the stagnation eliminating block 27. This allows the possibility of a burn occurring on the inside curved part 35 and the outside curved part 34 to be reduced.

Third Embodiment

Figure 8:
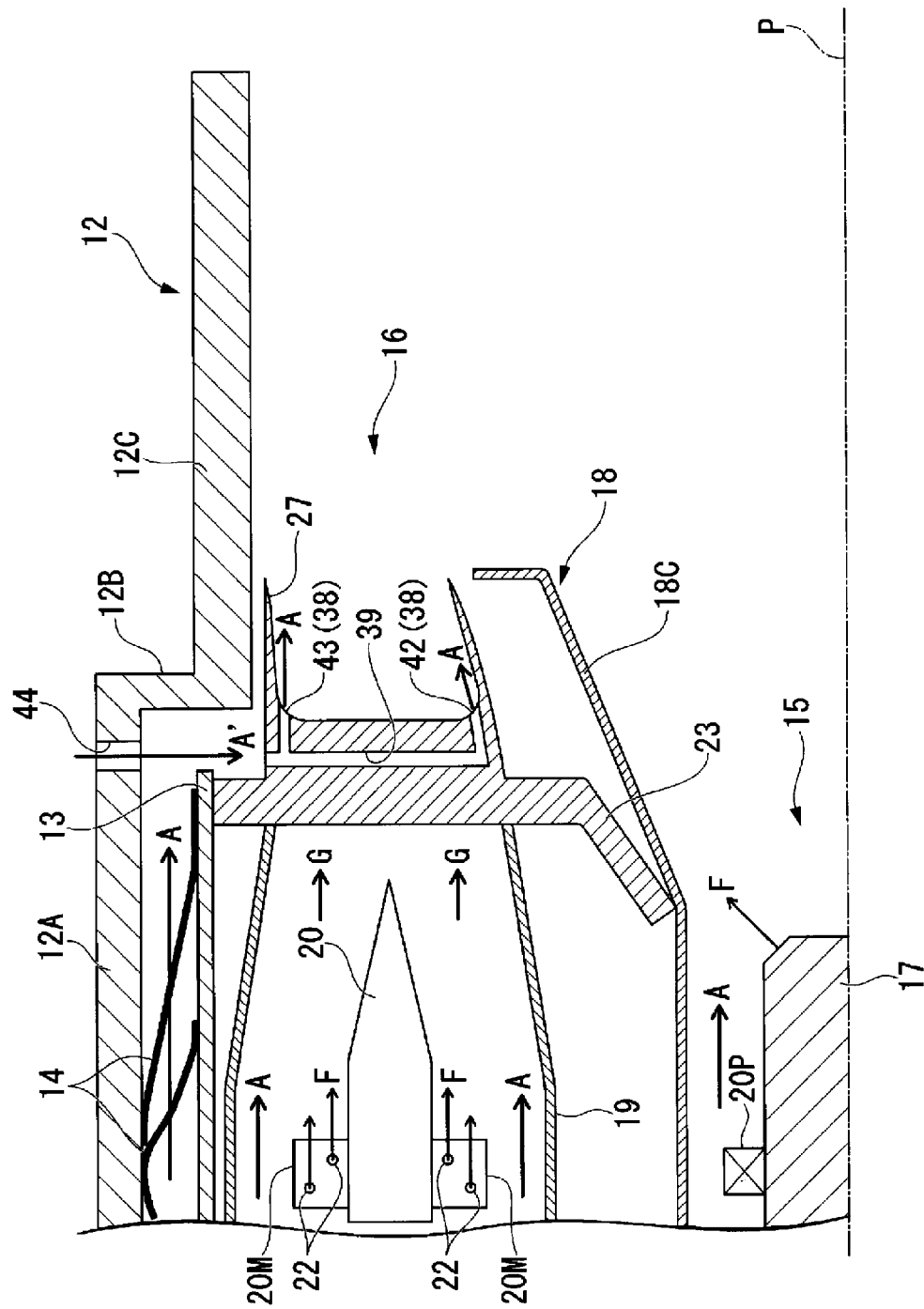
FIG. 8 is an expanded view drawing of important parts of a combustor according to a third embodiment of the present invention.

Next, a third embodiment of the present invention will be described with reference to FIG. 8 to FIG. 10. The combustor 3 according the present embodiment differs from each embodiment described above with regard to the following points. That is, as illustrated in FIG. 8, the combustor 3 according to the present embodiment is provided with a chamber air inlet 44 piercing the surface of the combustion cylinder 12. The chamber air inlet 44 is provided on the surface of the combustion cylinder 12, in a position corresponding in the direction of the axis P with the end part of the downstream side of the swirler support cylinder 13.

Figure 9:
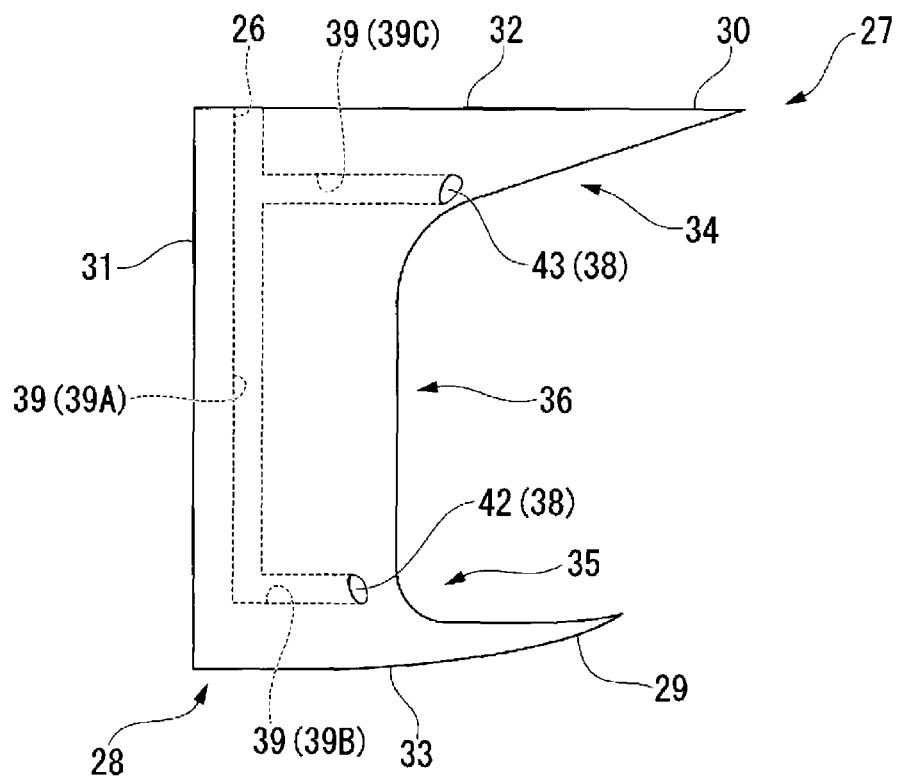
FIG. 9 is a drawing of a stagnation eliminating block according to the third embodiment of the present invention viewed from the circumferential direction of the combustor.
Figure 10:
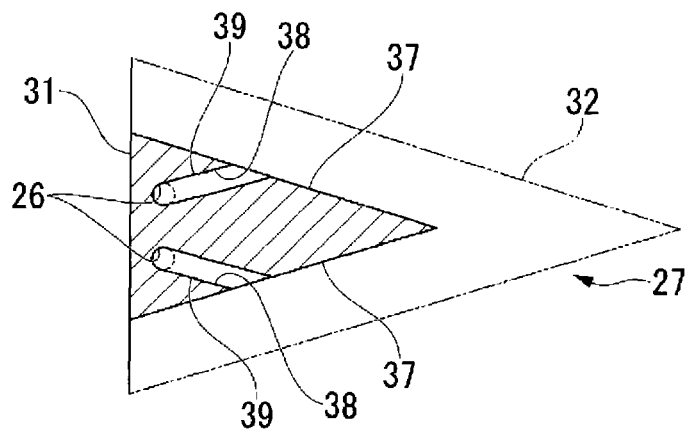
FIG. 10 is a drawing of a stagnation eliminating block according to the third embodiment of the present invention viewed from the radial direction of the combustor.

Further, as illustrated in FIG. 9 and FIG. 10, in the combustor 3 according to the present embodiment, the air inlet 26 on the stagnation eliminating block 27 is provided on a block outer periphery surface 32, which is the outside surface in the radial direction of the stagnation eliminating block 27. Specifically, two air inlets 26 are arranged with an interval between them in the circumferential direction in the space on the upstream side of the block outer periphery surface 32.

Further, in the interior of the stagnation eliminating block 27, the air film channel 39 is formed extending toward the inside along the radial direction from the air inlet 26. The air inlet 26 is connected to the air film supply port 38 provided on the block side surface 37 via the air film channel 39.

In more detail, the air film channel 39 according to the present embodiment has a main flow channel 39A extending along the radial direction, and two branch channels 39B, 39C formed extending toward the downstream side from halfway through the main channel 39A. The branch channel 39B is provided on the inside in the radial direction, and the branch channel 39C is provided on the outside in the radial direction.

With a configuration as described above, the air (chamber air A') flowing through a space (chamber 11) on the outside of the combustion cylinder 12 can be taken into the interior of the combustion cylinder 12 by a chamber air inlet 44. The chamber air A' is supplied from the compressor 2 as a part of the compressed air A, in the same manner as the substrate air A described above. While a small fuel component is contained in the substrate air A, a fuel component is not contained in the chamber air A'. Thus, the possibility of flashback occurring from the gas component being ignited can be reduced.

Further, with a configuration like that described above, the substrate air A is not used as an air film, and can be used as combustion air for the premixing flame in the swirler support cylinder 13. Thus, the combustion efficiency can be improved, and the combustion gas G generated by the combustor 3, that is, the exhaust gas of the gas turbine 1 can be kept in a cleaner state.

Embodiment of the present invention have been described above in detail with reference to the drawings, but the specific configurations are not limited to the embodiments, and design changes and the like that do not depart from the scope of the present invention are also included.

For example, in the third embodiment described above, an example is described wherein the air film supplying port 38 is formed as an opening on the block side surface 37, as illustrated in FIG. 9. However, the shape of the air film supplying port 38 is not limited to this, and may be formed in a substantially rectangular slit shape extending along the radial direction over the block side surface 37, in the same manner as the first embodiment.

Figure 11:
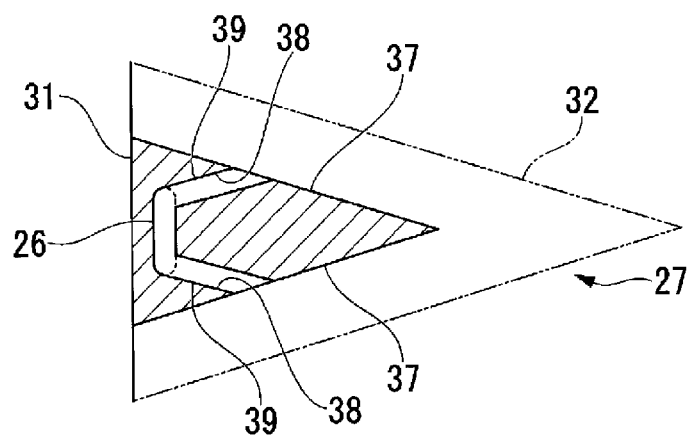
FIG. 11 is a drawing of a variation of a stagnation eliminating block according to the third embodiment of the present invention.

Further, in the third embodiment, a configuration is described wherein two air inlets 26 are provided corresponding to each of the air film supplying ports 38 on the block side surface 37. However, the mode of the air inlet 26 is not limited to this, and for example, as illustrated in FIG. 11, the air inlet 26 may be a through-hole having a cross-sectional shape that is an elliptical shape when viewed from the radial direction. According to such a configuration, the cross-sectional area of the air inlet 26 can be increased, thereby allowing air from the chamber 11 to be more effectively taken in toward the air film channel 39.

INDUSTRIAL APPLICABILITY

According to the combustor and the gas turbine described above, the combustion efficiency can be improved, and the generation of NOx can be further mitigated.

REFERENCE SIGNS LIST

1 Gas turbine
2 Compressor
3 Combustor
4 Turbine
5 Rotor
6 Stator
7 Rotating shaft
8 Circular blade group
9 Casing
10 Circular vane group
11 Combustor compressor cylinder
12 Combustion liner
13 Swirler assembly
12A Large diameter part
12B Small diameter part
12C Ridge part
14 Fixed member
15 Pilot burner
16 Premixing burner
17 Pilot nozzle
18 Pilot cone
18C Tapered cone portion
19 Main swirler
20 Main nozzle
19A Short side part
19B Long side part
20P Pilot swirler
20M swirler
22 Fuel ejection hole
23 Swirler base
24 Support opening
25 Substrate slit part
26 Air inlet
27 block
28 Block base part
29 Inside protruding part
30 Outside protruding part
31 Block substrate surface
32 Block outer periphery surface
33 Block inner periphery surface
34 Outside curved part
35 Inside curved part
36 Straight part
37 Block side surface
38 Air film supplying port
39 Air film channel
40 Angle
41 Substrate air
42 First supplying port
43 Second supplying port
44 Cylinder air inlet
A Compressed air
F Premixed gas
G Combustion gas
O Axis
P Axis

The invention claimed is:

1. A combustor, comprising:
   a pilot burner disposed along an axis;
   a plurality of premixing burners, each of which has a premixing swirler cylinder and a premixing nozzle disposed inside the premixing swirler cylinder, the premixing burners being disposed about the axis in a circumferential direction so as to surround a periphery of the pilot burner;
   a substrate, through which the pilot burner and the premixing swirler cylinders are individually inserted so as to be supported therein; and
   stagnation eliminating blocks provided so as to fill spaces between the premixing swirler cylinders on a downstream side surface of the substrate;
   wherein each of the stagnation eliminating blocks is formed with at least one air inlet port and air film supplying ports, and the air film supplying ports are open ports formed on exterior surfaces of the stagnation eliminating blocks and are configured to form air films along the exterior surfaces such that possibility of a burn occurring on the exterior surfaces is reduced, and
   wherein the at least one air inlet port and the air film supplying ports communicate with each other via air film channels penetrating through the stagnation eliminating blocks.

2. The combustor according to claim 1, wherein, for each of the stagnation eliminating blocks, the at least one air inlet port is provided on an outside peripheral surface.

3. The combustor according to claim 1, wherein, for each of the stagnation eliminating blocks, the air film supplying ports include port spaced apart in a radial direction.

4. The combustor according to claim 3, wherein each of the stagnation eliminating blocks decreases in dimension with respect to the circumferential direction from an upstream side to a downstream side, and for each of the stagnation elimination blocks, the air film supplying ports are provided on two of the exterior surfaces, the two of the exterior surfaces being located on different sides with respect to the circumferential direction.

5. A gas turbine, comprising:
   a combustor according to claim 1;
   a compressor for supplying compressed air to the combustor; and
   a turbine, to which combustion gas generated by the combustor is supplied.

* * * * *